March 11, 1941.  D. A. GURNEY ET AL  2,234,163
DRAFT COUPLING
Filed Sept. 12, 1939   2 Sheets-Sheet 1
Fig-1-
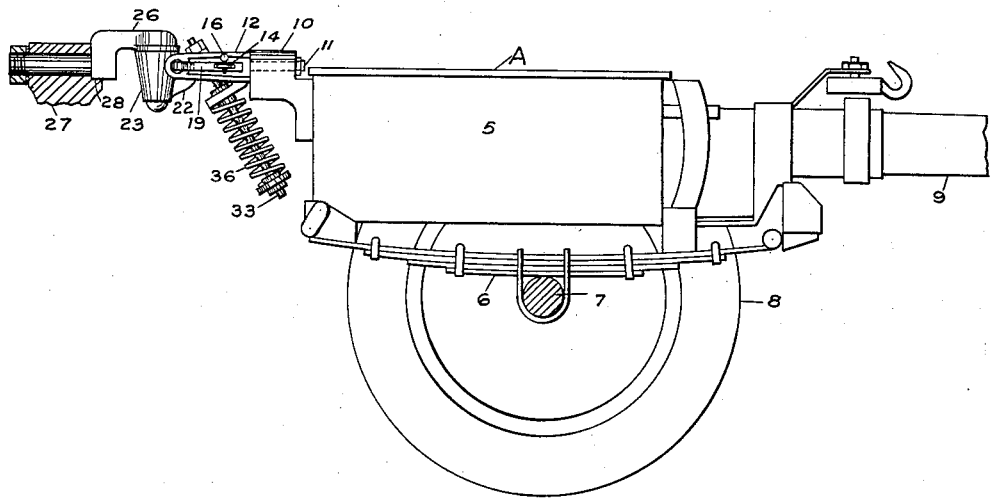
Fig-2-
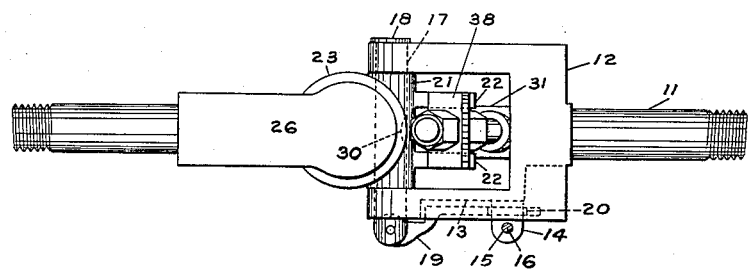
Inventors
Dayton A. Gurney
Thomas A. Conlon
By: GJKessenich & JHChurch
Attorneys

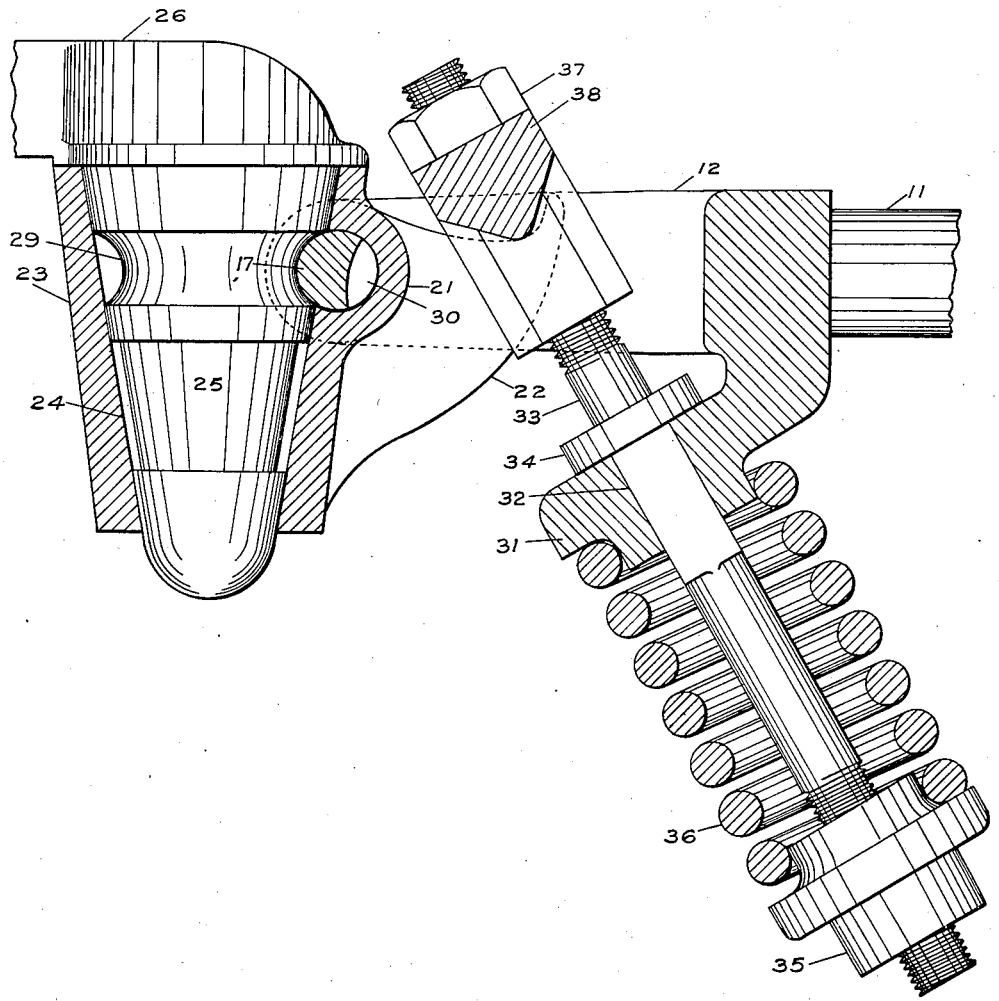

Patented Mar. 11, 1941

2,234,163

UNITED STATES PATENT OFFICE 2,234,163

DRAFT COUPLING

Dayton A. Gurney, Landover, and Thomas A. Conlon, Silver Spring, Md.

Application September 12, 1939, Serial No. 294,460

4 Claims. (Cl. 280—33.9)

(Granted under the act of March 3, 1883, as amended April 30, 1928; 370 O. G. 757)

The invention described herein may be manufactured and used by or for the Government for governmental purposes, without the payment to use of any royalty thereon.

The subject of this invention is a draft coupling.

The purpose of the invention is to provide a simple and efficient draft coupling which is especially applicable in connecting carts such as limbers and caissons.

Further objects are to provide a coupling which will eliminate weaving of the trail cart, which will permit wide angular movements in all directions, which will control the load on the end of the horse pole to eliminate injury to the wheel-horse team, and which will provide for adjustment of the pole according to the height of the wheel-horse team.

To these and other ends, the invention consists in the construction, arrangement and combination of elements described hereinafter and pointed out in the claims forming a part of this specification.

A practical embodiment of the invention is illustrated in the accompanying drawings, wherein:

Fig. 1 is a view in side elevation of a lead cart equipped with the improved coupling.

Fig. 2 is a plan view of the coupling.

Fig. 3 is a view of the coupling in side elevation with parts in section.

Referring to the drawings by characters of reference there is shown a lead cart A comprising a body 5, mounted by means of springs 6 on an axle 7 which carries wheels 8. A center pole 9 for a wheel horse team is fixed to the body 5 so that these members form a rigid unit. A bracket 10 fixed on the rear end of the body provides a bearing for swivelly mounting the cylindrical portion 11 of a draw bar. The draw bar includes a rearwardly extending yoke 12 one arm of which is provided with a side recess 13 and with a laterally projecting keeper plate 14 having an aperture 15 for receiving a pin 16.

A bolt 17 journaled in the rear extremities of the arms of the yoke is formed with a head 18 on one end while the other end pivotally carries a latch 19 which provides means for rotating the bolt. The latch is movable into and out of the recess 13 and has a slot 20 for the keeper plate 14.

The bolt 17 pivotally carries a coupling member 21 which includes a pair of spaced fingers 22—22 disposed forwardly of the bolt between the arms of the yoke and also a socket portion 23 disposed rearwardly of the bolt. The socket portion is formed with a normally vertically disposed tapered aperture 24 for receiving a pintle in the form of tapered stud 25 which depends from a bar 26 mounted in a trailer cart indicated at 27 and held against rotation relative thereto by a lip 28.

The means for connecting the stud and socket portion is similar to that shown in U. S. Patent No. 1,680,236 and is accomplished by the engagement of the bolt 17 in an annular groove 29 in the stud. The bolt is formed with a recess 30 shaped to correspond to the aperture 24 so that in one position of the bolt it will not interfere with entrance or removal of the stud while in another position it will engage in the groove 29 and maintain the connection.

The yoke of the draw bar is provided with a rearwardly and downwardly inclined seat 31 having a non-circular aperture 32. A rod 33 having a non-circular portion slidable in the aperture 32 is formed with a collar 34 which is engageable with the upper side of the seat. A nut 35 threaded on the lower end of the rod provides an adjustable seat for a helical spring 36 whose upper end engages the inclined seat 31.

A nut 37 threaded on the upper part of the rod above the inclined seat 31 is positionable between the spaced fingers 22 of the coupling member 21 and includes a pair of laterally projecting lugs 38 adapted to be engaged from underneath by the fingers.

The lead cart has a pole preponderance of about forty pounds so that the body and pole normally tip about the axle 7 or wheels 8 and tend to elevate the draw bar as represented by the bolt 17. With lead and trail carts coupled as shown in Fig. 1 the nut 37 has a position of adjustment on the rod so that the body load will be equilibrated by the spring 36. By varying the position of adjustment of the nut the pole may be normally maintained in an inclined position to alter its height according to the size or height of the wheel horse team. This arrangement controls the load on the end of the pole and eliminates injury to the team.

Any movement of the carts which tends to elevate the bolt 17 maintains the connection between the rod 33 and the fingers 22 of the coupling member. Any movement which tends to lower the bolt as shown in Fig. 3 separates the nut 37 from engagement with the fingers 22 and thereby inoperates or disconnects the spring 36. The stud 25 serves as the axis for relative turning of the carts. If the trail cart overturns the complete draft coupling rotates with the overturned cart about the cylindrical portion 11 of the draw bar and under this condition the carts turn relatively on the bolt 17 and disconnect the nut 37 and fingers 22.

We claim:

1. In a coupling for connecting a lead and trail vehicle, a draw bar adapted to be swively mounted on the lead vehicle, a rearwardly extending yoke on the draw bar, a bolt rotatably carried by the yoke, a coupling member pivotally mounted on the bolt and having a socket, a pintle adapted to be carried by the trail vehicle and inserted in the socket of the coupling member, said pintle having an annular groove engageable by the bolt, a seat fixed on the draw bar, a rod slidably and non-rotatably mounted in the seat, a collar on the rod engageable with the upper side of the seat, an adjustable seat on the lower end of the rod, a spring between the fixed and movable seats, a member adjustably mounted on the upper end of the rod, and means on the coupling member extending forwardly of the bolt and engaging the member on the rod to compress the spring.

2. In a coupling for connecting a lead and trail vehicle, a draw bar adapted to be carried by the lead vehicle and including a yoke, a bolt rotatably carried by the yoke, a coupling member pivotally mounted on the bolt and having a socket, a pintle adapted to be carried by the trail vehicle and retained in the socket of the coupling member by the bolt, a rod slidably and non-rotatably mounted in the draw bar, a spring between the draw bar and the lower end of the rod, and means on the coupling member for engaging the rod to compress the spring.

3. In a coupling for connecting a lead and a trail vehicle, a draw bar adapted to be carried by the lead vehicle, a coupling member adapted to be carried by a trail vehicle, a horizontally disposed bolt pivotally connecting the draw bar and coupling member, a rod slidably mounted in the draw bar, a spring normally urging said rod downwardly, a member longitudinally adjustable on the rod, and means on the coupling member for engaging the member on the rod to move the rod against the action of the spring.

4. In a coupling for connecting a lead and a trail vehicle, a draw bar adapted to be carried by the lead vehicle and including a yoke, a bolt extending horizontally across the yoke and rotatably mounted therein, a coupling member mounted on the bolt for movement in a vertical plane and including a socket, a pintle adapted to be carried by the trail vehicle and rotatable in the socket of the coupling member, said pintle having an annular groove engageable by the bolt.

DAYTON A. GURNEY.
THOMAS A. CONLON.